(12) United States Patent
Uenishi

(10) Patent No.: US 11,175,645 B2
(45) Date of Patent: Nov. 16, 2021

(54) NUMERICAL CONTROLLER, NUMERICAL CONTROL METHOD, AND NUMERICAL CONTROL PROGRAM

(71) Applicant: FANUC CORPORATION, Yamanashi (JP)

(72) Inventor: Daisuke Uenishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 242 days.

(21) Appl. No.: 16/427,855

(22) Filed: May 31, 2019

(65) Prior Publication Data

US 2020/0012259 A1 Jan. 9, 2020

(30) Foreign Application Priority Data

Jul. 6, 2018 (JP) .............................. JP2018-129074

(51) Int. Cl.
*G05B 19/4103* (2006.01)
*G05B 19/4093* (2006.01)
(Continued)

(52) U.S. Cl.
CPC ....... *G05B 19/4103* (2013.01); *G05B 19/182* (2013.01); *G05B 19/4093* (2013.01); *G05B 19/41* (2013.01)

(58) Field of Classification Search
CPC .............. G05B 19/4103; G05B 19/182; G05B 19/4093; G05B 19/41
(Continued)

(56) References Cited

U.S. PATENT DOCUMENTS 4,514,814 A * 4/1985 Evans ................ G05B 19/4141
700/169
6,609,045 B1 * 8/2003 Fujino .................. G05B 19/408
700/189

(Continued)

FOREIGN PATENT DOCUMENTS

JP H06-179581 A * 3/1994
JP 07-146704 6/1995

(Continued)

OTHER PUBLICATIONS

English Translation of Japanese Patent Application Office Action dated Aug. 6, 2020 (R2) for Application #2018-129074 (translation courtesy Global Dossier. Furnished as English ver. of IDS submittal of said office action) 3 pages (Year: 2020).*

(Continued)

*Primary Examiner* — Mohammad Ali
*Assistant Examiner* — Joshua T Sanders
(74) *Attorney, Agent, or Firm* — Wenderoth, Lind & Ponack, L.L.P.

(57) ABSTRACT

Provided are a numerical controller, a numerical control method, and a numerical control program capable of suppressing reduction in machining surface quality while increasing machining efficiency. A numerical controller comprises: a program analysis unit that analyzes a machining program for controlling a machine tool and calculates a cumulative moving distance for each command block based on a designated coordinate; a control point generation unit that generates, based on the moving distance and a designated speed for each command block, a control point as a set of the moving distance and the speed at a start point and an end point in the command block; a commanded speed generation unit that generates a parametric curve defining a commanded speed for the moving distance based on the control points; and a commanded speed output unit that (Continued)

outputs the generated commanded speed per interpolation unit.

7 Claims, 12 Drawing Sheets

(51) Int. Cl.
 *G05B 19/41* (2006.01)
 *G05B 19/18* (2006.01)
(58) Field of Classification Search
 USPC .......................................................... 700/86
 See application file for complete search history.

(56) References Cited

U.S. PATENT DOCUMENTS

| 10,268,184 | B2* | 4/2019 | Hsu | G05B 19/4163 |
| 2009/0248203 | A1* | 10/2009 | Nakamura | G05B 19/4103 |
| | | | | 700/251 |

FOREIGN PATENT DOCUMENTS

| JP | 2005-352876 | 12/2005 |
| JP | 2006-011808 | 1/2006 |
| JP | 2017-204072 | 11/2017 |

OTHER PUBLICATIONS

Notification of Reasons for Refusal dated Aug. 11, 2020 in corresponding Japanese Patent Application No. 2018-129074.

* cited by examiner (1) G00 X0.0 Y0.0
(2) G01 X10.0 Y10.0 F1000
(3) X15.0 Y13.0 F2000
(4) X18.0 Y11.0 F2500
(5) X20.0 Y5.0 F1100

| BLOCK NUMBER | PROGRAM COMMAND |
|---|---|
| 1 | G00 X0.0 Y0.0 |
| 2 | G01 X10.0 Y10.0 F1000 |
| 3 | X15.0 Y13.0 F2000 |
| 4 | X18.0 Y11.0 F2500 |
| 5 | X18.0 Y11.0 F2500 |
| ... | ... |

| BLOCK NUMBER | MOVE DISTANCE $B_p$ | SPEED $F_p$ |
|---|---|---|
| 1 | $B_0$ | $F_0$ |
| 2 | $B_1$ | $F_1$ |
| 3 | $B_2$ | $F_2$ |
| 4 | $B_3$ | $F_3$ |
| 5 | $B_4$ | $F_4$ |
| ... | ... | ... |

$$\Delta B_p = \sqrt{\Delta A_1^2 + \Delta A_2^2 + \cdots} \quad (\Delta A_n: \text{STROKE ALONG EACH AXIS})$$

COMMAND FOR XY $\quad \Delta B_p = \sqrt{\Delta X^2 + \Delta Y^2}$

| BLOCK NUMBER | MOVE DISTANCE $B_p$ | SPEED $F_p$ |
|---|---|---|
| 1 | $B_0$ | $F_0$ |
| 2 | $B_1$ | $F_1$ |
| 3 | $B_2$ | $F_2$ |
| 4 | $B_3$ | $F_3$ |
| 5 | $B_4$ | $F_4$ |
| ... | ... | ... |

⇒

| CONTROL POINT $P_i$ | MOVE DISTANCE $P_{bi}$ | SPEED $P_{fi}$ |
|---|---|---|
| $P_0$ | $B_0$ | $F_0$ |
| $P_1$ | $B_0$ | $F_1$ |
| $P_2$ | $B_1$ | $F_1$ |
| $P_3$ | $B_1$ | $F_2$ |
| $P_4$ | $B_2$ | $F_2$ |
| $P_5$ | $B_2$ | $F_3$ |
| $P_6$ | $B_3$ | $F_3$ |
| $P_7$ | $B_3$ | $F_4$ |
| $P_8$ | $B_4$ | $F_4$ |
| ... | ... | ... |

QUADRATIC B-SPLINE CURVE → QUINTIC B-SPLINE CURVE

```
M400 C5. A110.
(1) G00 X0.0 Y0.0
(2) G01 X10.0 Y10.0 F1000
(3)     X15.0 Y13.0 F2000
(4)     X18.0 Y11.0 F2500
(5)     X20.0 Y5.0  F1100
...
M401
```

COMMAND STYLE
  ENABLE FUNCTION    M400 C∗∗. A∗∗.
  DISABLE FUNCTION   M401
  C: ORDER (1～n)
  A: COEFFICIENT     0: OFF
                                 1～1000: ON (MAGNIFICATION %)

```
M400 C5. A110.
( 1) G00 X0.0 Y0.0
( 2) G01 X2.5 Y2.5 F1000
( 3) X5.0 Y5.0    ······MODAL SPEED INFORMATION F1000
( 4) X7.5 Y7.5 F1005
( 5) X10.0 Y10.0 ······MODAL SPEED INFORMATION F1005
( 6) X12.5 Y11.5 F2000
( 7) X15.0 Y13.0 ······MODAL SPEED INFORMATION F2000
( 8) X16.5 Y12.0 F2500
( 9) X18.0 Y11.0 ······MODAL SPEED INFORMATION F2500
(10) X19.0 Y8.0 F1000
(11) X20.0 Y5.0  ······MODAL SPEED INFORMATION F1000
 . . .
M401
```

FIG. 17

| CONTROL POINT $P_i$ | MOVE DISTANCE $P_{bi}$ | SPEED $P_{fi}$ |
|---|---|---|
| $P_0$ | $B_0 = 0$ | $F_0 = 0$ |
| $P_1$ | $B_0 = 0$ | $F_1 = 1000$ |
| $P_2$ | $B_1 = 3.546$ | $F_1 = 1000$ |
| $P_3$ | $B_2 = 7.071$ | $F_2 = 1000$ |
| $P_4$ | $B_3 = 10.607$ | $F_3 = 1005$ |
| $P_5$ | $B_4 = 14.142$ | $F_4 = 1005$ |
| $P_6$ | $B_4 = 14.142$ | $F_5 = 2000$ |
| $P_7$ | $B_5 = 17.058$ | $F_5 = 2000$ |
| $P_8$ | $B_6 = 19.973$ | $F_6 = 2000$ |
| $P_9$ | $B_6 = 19.973$ | $F_7 = 2500$ |
| $P_{10}$ | $B_7 = 21.776$ | $F_7 = 2500$ |
| $P_{11}$ | $B_8 = 23.579$ | $F_8 = 2500$ |
| $P_{12}$ | $B_8 = 23.579$ | $F_9 = 1000$ |
| $P_{13}$ | $B_9 = 26.741$ | $F_9 = 1000$ |
| $P_{14}$ | $B_{10} = 29.903$ | $F_{10} = 1000$ |

FIG. 18

| CONTROL POINT $P_i$ | MOVE DISTANCE $P_{bi}$ | SPEED $P_{fi}$ |
|---|---|---|
| $P_0$ | $B_0 = 0$ | $F_0 = 0$ |
| $P_1$ | $B_0 = 0$ | $F_1 = 1000$ |
| | ~~$B_1 = 3.546$~~ | ~~$F_1 = 1000$~~ |
| | ~~$B_2 = 7.071$~~ | ~~$F_2 = 1000$~~ |
| | ~~$B_3 = 10.607$~~ | ~~$F_3 = 1005$~~ |
| $P_2$ | $B_4 = 14.142$ | $F_4 = 1005$ |
| $P_3$ | $B_4 = 14.142$ | $F_5 = 2000$ |
| | ~~$B_5 = 17.058$~~ | ~~$F_6 = 2000$~~ |
| $P_4$ | $B_6 = 19.973$ | $F_6 = 2000$ |
| $P_5$ | $B_6 = 19.973$ | $F_7 = 2500$ |
| | ~~$B_7 = 21.776$~~ | ~~$F_7 = 2500$~~ |
| $P_6$ | $B_8 = 23.579$ | $F_8 = 2500$ |
| $P_7$ | $B_8 = 23.579$ | $F_9 = 1000$ |
| | ~~$B_9 = 26.741$~~ | ~~$F_9 = 1000$~~ |
| $P_8$ | $B_{10} = 29.903$ | $F_{10} = 1000$ |

COMMAND STYLE
  ENABLE FUNCTION    M400 C. A. B. D.
  DISABLE FUNCTION   M401
  C: ORDER (1~n)
  A: COEFFICIENT      0: OFF
                               1~1000: ON (MAGNIFICATION %)
  B: CONTROL POINT OMISSION
    B1. ON
    B0. OFF
  D: RANGE OF OMISSION
    D10.                 DISREGARD SPEED CHANGE OF PLUS OR MINUS F10 MM/min

NUMERICAL CONTROLLER, NUMERICAL CONTROL METHOD, AND NUMERICAL CONTROL PROGRAM

This application is based on and claims the benefit of priority from Japanese Patent Application. No. 2018-129074, filed on 6 Jul. 2018, the content of which is incorporated herein by reference.

BACKGROUND OF THE INVENTION

Field of the Invention

The present invention relates to a numerical controller, a numerical control method, and a numerical control program for changing a commanded speed during machining.

Related Art

In many conventional cases, a machining program for controlling a machine tool contains an initially set feed speed to perform machining at a constant speed. In the machining program, a speed command can be given for each command block (see patent document 1, for example), and thus, in some cases, a speed command for each command block has been changed in response to machining load changing according to a shape or a machining position in order to shorten machining time, thereby encouraging improvement of machining efficiency.

Patent Document 1: Japanese Unexamined Patent Application, Publication No. 2017-204072

SUMMARY OF THE INVENTION

However, since a machine that accelerates or decelerates at a high speed is capable of following a speed command promptly, the speed does not change smoothly when a command value changes during machining. Thus, steep increase in machining load due to the impact of acceleration/deceleration has caused cutting vibration, etc., resulting in problems of reduction in tool life and machining surface quality.

While the impact may be suppressed by controlling acceleration/deceleration, since this extends machining time, settings are made to complete acceleration/deceleration within a short time. This has resulted in cases where the machining surface quality differs discontinuously between positions of speed change even on the same machining surface, determined as having defective machining surface quality.

The present invention is intended to provide a numerical controller, a numerical control method, and a numerical control program capable of suppressing reduction in machining surface quality while increasing machining efficiency.

(1) A numerical controller according to the present invention (numerical controller 1 described later, for example) comprises: a program analysis unit (program analysis unit 11 described later, for example) that analyzes a machining program for controlling a machine tool and calculates a cumulative moving distance for each command block based on a designated coordinate; a control point generation unit (control point generation unit 12 described later, for example) that generates, based on the moving distance and a designated speed for each command block, a control point as a set of the moving distance and the speed at a start point and an end point in the command block; a commanded speed generation unit (commanded speed generation unit 13 described later, for example) that generates a parametric curve defining a commanded speed for the moving distance based on the control points; and a commanded speed output unit (commanded speed output unit 14 described later, for example) that outputs the generated commanded speed per interpolation unit.

(2) In the numerical controller described in (1), the commanded speed generation unit may adjust the commanded speed using a predetermined coefficient.

(3) In the numerical controller described in (1) or (2), the parametric curve may be any one of a B-spline curve, a Bézier curve, and a non-uniform rational B-spline (NURBS) curve.

(4) In the numerical controller described in any one of (1) to (3), the control point generation unit may omit control points having a speed equal to those of both their preceding and following control points.

(5) In the numerical controller described in (4), the control point generation unit may omit control points having a speed difference with their preceding and following control points within a designated speed range.

(6) A numerical control method according to the present invention is executed by a computer (numerical controller 1 described later, for example), the numerical control method comprising: a program analysis step of analyzing a machining program for controlling a machine tool and calculating a cumulative moving distance for each command block based on a designated coordinate; a control point generation step of generating, based on the moving distance and a designated speed for each command block, a control point as a set of the moving distance and the speed at a start point and an end point in the command block; a commanded speed generation step of generating a parametric curve defining a commanded speed for the moving distance based on the control points; and a commanded speed output step of outputting the generated commanded speed per interpolation unit.

(7) A numerical control program according to the present invention is for causing a computer (numerical controller 1 described later, for example) to execute: a program analysis step of analyzing a machining program for controlling a machine tool and calculating a cumulative moving distance for each command block based on a designated coordinate; a control point generation step of generating, based on the moving distance and a designated speed for each command block, a control point as a set of the moving distance and the speed at a start point and an end point in the command block; a commanded speed generation step of generating a parametric curve defining a commanded speed for the moving distance based on the control points; and a commanded speed output step of outputting the generated commanded speed per interpolation unit.

The numerical controller according to the present invention is capable of suppressing reduction in machining surface quality while increasing machining efficiency.

BRIEF DESCRIPTION OF THE DRAWINGS

FIG. 17 shows an example in which none of the control points derivable from the machining program are omitted according to the third embodiment;

FIG. 18 shows an example in which some of the control points derivable from the machining program are omitted according to the third embodiment; and FIG. 19 illustrates an example of a method of designating a function of omitting control points in the machining program according to the third embodiment.

DETAILED DESCRIPTION OF THE INVENTION

First Embodiment

A first embodiment of the present invention will be described hereafter. A numerical controller 1 according to the first embodiment executes a machining program in which a coordinate indicating the position of each axis and a feed speed are designated for each command block, and controls a machine tool. When executing the machining program, the numerical controller 1 analyzes each command block and controls an actual feed speed up to a designated coordinate based on a designated speed. At this stage, the numerical controller 1 generates a parametric curve with gentler speed change for multiple control points associating cumulative moving distance calculated from a coordinate designated for each command block with a designated speed, and outputs a commanded speed for the moving distance on the basis of the generated parametric curve.

Figures 1, 2:
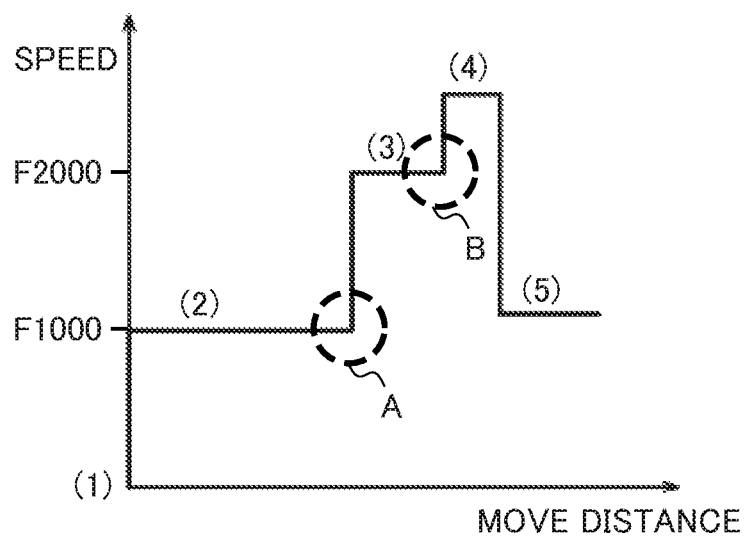
FIG. 1 illustrates an example of a machining program according to a first embodiment.
FIG. 2 illustrates an example of transition of a speed designated for each command block in the machining program according to the first embodiment.

FIG. 1 illustrates an example of the machining program according to the first embodiment. In this example, it is designated that the machining is executed from an origin designated in block number 1 to coordinates (10.0, 10.0) in block number 2 at a feed speed F1000. Likewise, it is designated that the machining is executed to coordinates (15.0, 13.0) in block number 3 at a feed speed F2000, to coordinates (18.0, 11.0) in block number 4 at a feed speed F2500, and to coordinates (20.0, 5.0) in block number 5 at a feed speed F1100.

FIG. 2 illustrates an example of transition of a speed designated for each command block in the machining program according to the first embodiment. In this example, a speed designated for each command block is drawn relative to a cumulative moving distance from an origin, which is readable from the machining program shown in FIG. 1.

If the machine tool is controlled according to a designated speed, the speed changes discontinuously at a position where a command block is switched (for example, at a position A where block number 2 switches to block number 3, a position B where block number 3 switches to block number 4, and the like). This causes steep increase in machining load at these positions, leading to the risk of shortened tool life and reduction in machining surface quality.

Figure 3:
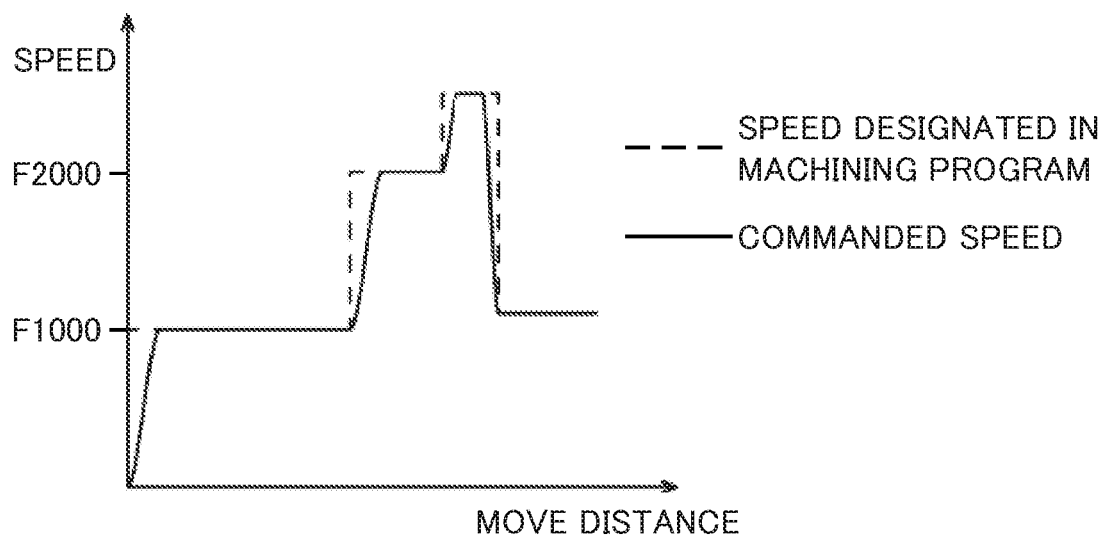
FIG. 3 illustrates an example of speed transition when acceleration/deceleration is controlled to a designated speed using the conventional technique based on the machining program according to the first embodiment.

FIG. 3 illustrates an example of speed transition when acceleration/deceleration is controlled to a designated speed using the conventional technique based on the machining program according to the first embodiment. In this case, the commanded speed changes more gently than in the case of FIG. 2, suppressing steep increase in machining load, but the time required for machining extends in response to the time needed for acceleration/deceleration. If time for the acceleration/deceleration is shortened in response to the above, since the resultant change in speed causes steep change in machining surface quality between command blocks, it is likely that, when continuous surface quality is required, the machining surface quality will be determined as defective.

Figure 4:
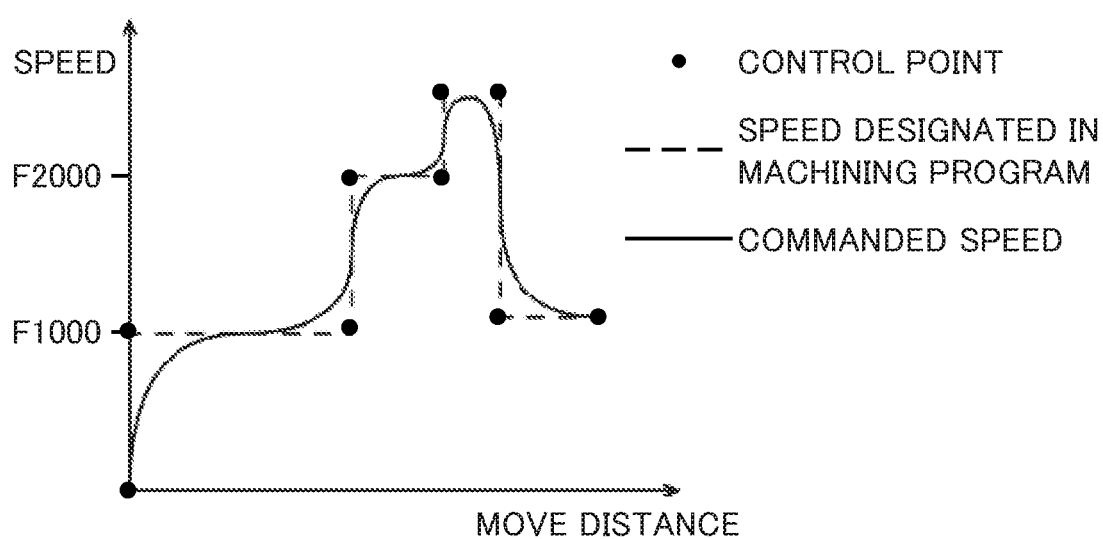
FIG. 4 illustrates an example of speed transition when a commanded speed for a machine tool is controlled on the basis of a parametric curve generated from the machining program by a numerical controller according to the first embodiment.

FIG. 4 illustrates an example of speed transition when a commanded speed for the machine tool is controlled on the basis of a parametric curve generated from the machining program by the numerical controller 1 according to the first embodiment. In this example, control points corresponding to a start point and an end point of a command block are provided, and a parametric curve is drawn based on these control points.

In this case, the commanded speed changes more gently, and further, compared to the machining time based on the speed designated in the machining program, a zone with higher speed and a zone with lower speed are generated, thereby maintaining substantially equal machining time.

Figures 5, 6:
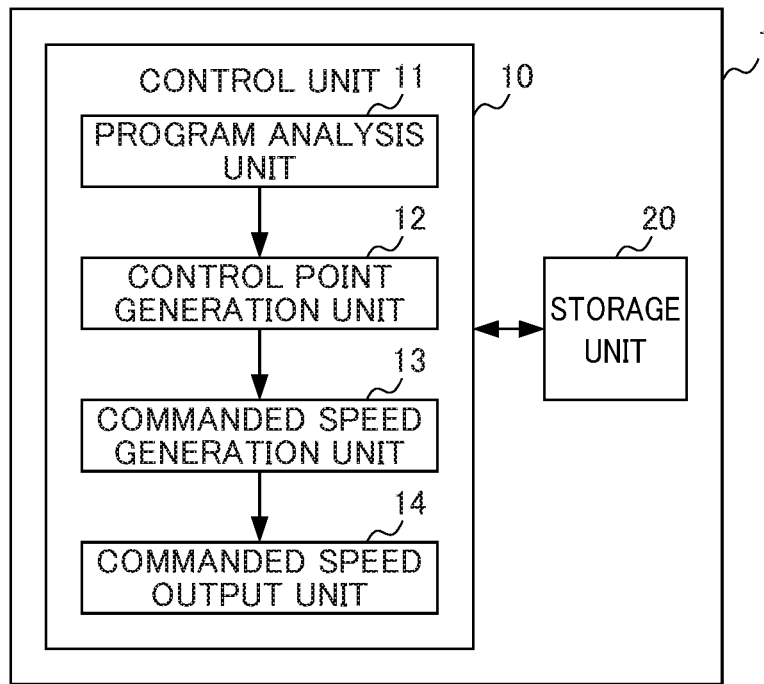
FIG. 5 shows the functional configuration of the numerical controller according to the first embodiment.
FIG. 6 shows association of a command block with a cumulative moving distance and a designated speed according to the first embodiment.

FIG. 5 shows the functional configuration of the numerical controller 1 according to the first embodiment. The numerical controller 1 is an information processor including a control unit 10 and a storage unit 20. To generate a parametric curve from a coordinate and a speed designated in a command block in the machining program and output an actual commanded speed on the basis of the parametric curve, the control unit 10 includes a program analysis unit 11, a control point generation unit 12, a commanded speed generation unit 13, and a commanded speed output unit 14. These functional units are realized by reading and execution of a numerical control program from the storage unit 20 by the control unit 10.

The program analysis unit 11 reads and analyzes the machining program for controlling the machine tool from the storage unit 20 or an external equipment. More specifically, in the first embodiment, the program analysis unit 11 extracts an end point coordinate and a designated value of speed from each command block forming the machining program.

Further, the program analysis unit 11 calculates a cumulative stroke $B_p$ from a machining start point to an end point of each command block based on the extracted coordinate, and acquires the cumulative moving distance $B_p$ and a designated speed $F_p$ for each command block.

FIG. 6 shows association of a command block with a cumulative moving distance and a designated speed according to the first embodiment. A coordinate and a designated value of speed are extracted from each command block, and a cumulative moving distance and a designated speed are associated with a block number.

Using a stroke $\Delta A_i$ along each axis, a moving distance $\Delta B_p$ for each command block is defined as follows:

$$\Delta B_p = \sqrt{\Delta A_1^2 + \Delta A_2^2 + \ldots}$$

For example, if a command is for two axes of X and Y, the following formula is established:

$$\Delta B_p = \sqrt{\Delta X^2 + \Delta Y^2}$$

Thus, the moving distance $\Delta B_p$ can be calculated based on a coordinate designated for each command block using the following formula:

$$\Delta B_0 = \sqrt{0^2 + 0^2} = 0$$

$$\Delta B_1 = \sqrt{10^2 + 10^2} = 14.142$$

$$\Delta B_2 = \sqrt{(15-10)^2 + (13-10)^2} = 5.831$$

and a cumulative moving distance is determined as follows:
$B_0 = \Delta B_0 = 0$
$B_1 = \Delta B_0 + \Delta B_1 = 14.142$
$B_2 = \Delta B_0 + \Delta B_1 + \Delta B_2 = 19.973$ Based on the cumulative moving distance $B_p$ up to an end point and the speed $F_p$ for each command block, the control point generation unit 12 generates control points $P_i = (P_{bi}, P_{fi})$ as a set of the cumulative moving distance and a speed at a start point and an end point in the command block.

Figure 7:
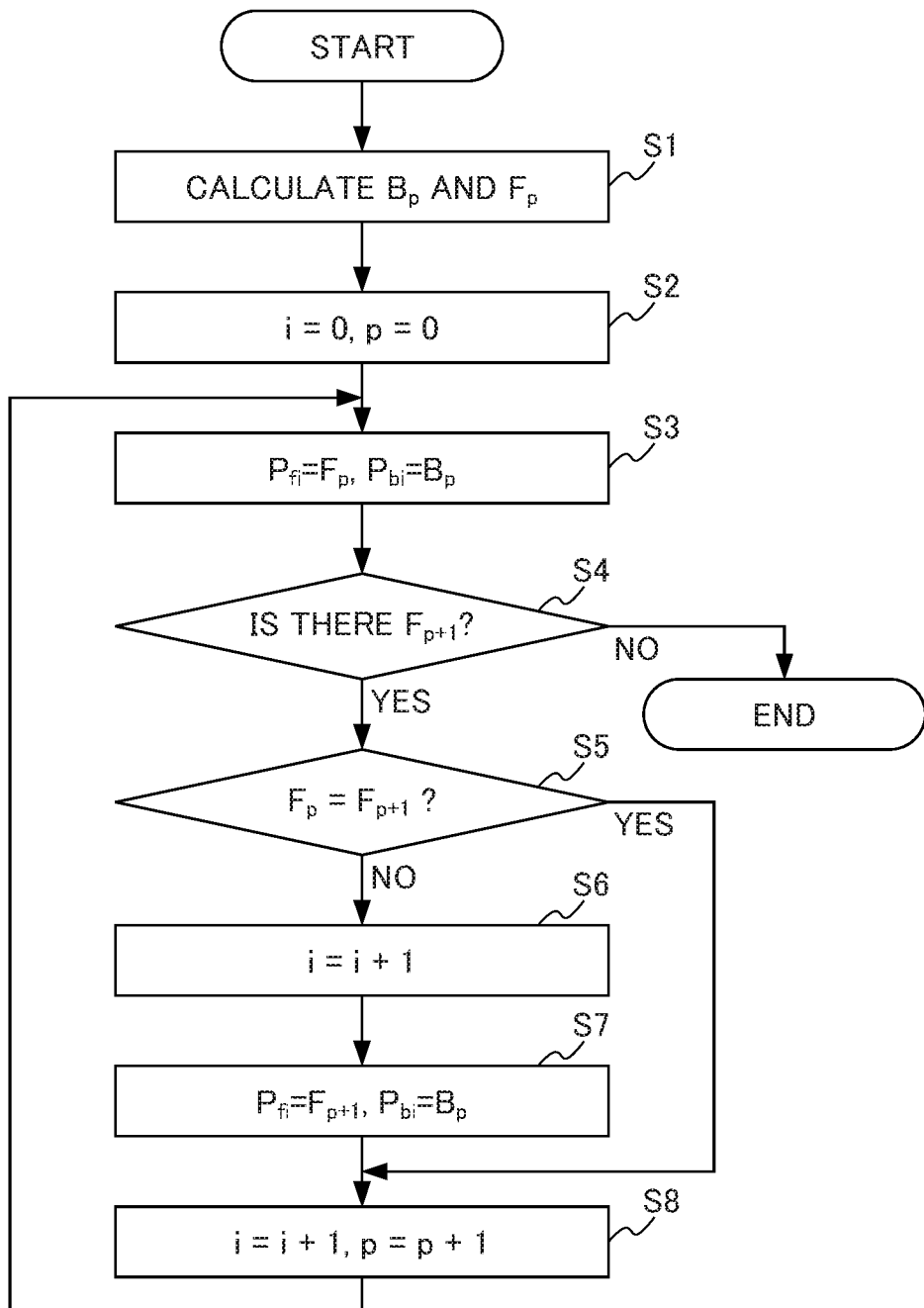
FIG. 7 is a flowchart showing a method of generating a control point according to the first embodiment.

FIG. 7 is a flowchart showing a method of generating a control point according to the first embodiment. In step S1, the program analysis unit 11 calculates the cumulative moving distance $B_p$ and the speed $F_p$ for each command block based on the content of designation for each command block in the machining program.

In step S2, the control point generation unit 12 initializes an index i to a control point as well as an index p to a command block down to zero. In step S3, the control point generation unit 12 calculates an i-th control point ($i \geq 0$) as $P_{fi} = F_p$, $P_{bi} = B_p$.

In step S4, the control point generation unit 12 determines whether or not a (p+1)-th command block, that is, $B_{p+1}$ and $F_{p+1}$, is present. If it is determined as YES, the processing shifts to step S5. If it is determined as NO, meaning that the control point generation is completed, the processing is finished.

In step S5, the control point generation unit 12 determines whether or not a designated speed in the current (p-th) command block and a designated speed in the next ((p+1)-th) command block are equal to each other. If it is determined as YES, the processing shifts to step S8. If it is determined as NO, the processing shifts to step S6.

In step S6, the control point generation unit 12 counts up the index i to generate a control point which corresponds to a start point of the next ((p+1)-th) command block and has a different speed from the current (p-th) command block. In step S7, the control point generation unit 12 calculates the i-th control point as follows: $P_{fi} = F_{p+1}$, $P_{bi} = B_p$.

In step S8, the indexes i and p are counted up to generate a control point which corresponds to an end point of the next ((p+1)-th) command block. Then, the processing returns to step S3.

Figures 8, 9:
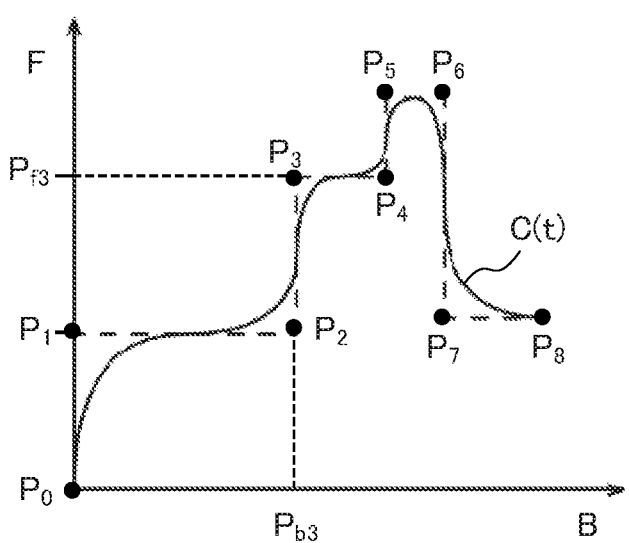
FIG. 8 shows an example of generation of a control point according to the first embodiment.
FIG. 9 shows an example of generation of control points and a B-spline curve according to the first embodiment.

FIG. 8 shows an example of generation of a control point according to the first embodiment. In this example, different speeds are designated in the respective command blocks. In this case, firstly, a control point $P_0 = (B_0, F_0)$ corresponding to a machining start point is generated from block number 1 (index p=0). From block number 2 or later (index p>0), a control point $P_{2p-1} = (B_{p-1}, F_p)$ corresponding to a start point and a control point $P_{2p} = (B_p, F_p)$ corresponding to an end point are generated.

Based on the generated control points, the commanded speed generation unit 13 generates a parametric curve defining a commanded speed for a moving distance. The parametric curve may be any one of a B-spline curve, a Bézier curve, and a non-uniform rational B-spline (NURBS) curve. In the following, the parametric curve is described as a B-spline curve.

A B-spine curve C(t) is defined using a basis function (blending function) $N_i^n(t)$, the control point $P_i$, knot (knot vector) t, an order n, and the number (m+1) of control points. A moving distance B(t) and a commanded speed F(t) are determined as follows from $P_{bi}$ and $P_{fi}$, respectively:

$$P_i = (P_{b_i}, P_{f_i}), P_i = P_0, P_1, P_2, \ldots, P_m$$

$$C(t) = \sum_{i=0}^{m} P_i N_i^n(t)$$

$$B(t) = \sum_{i=0}^{m} P_{b_i} N_i^n(t)$$

$$F(t) = \sum_{i=0}^{m} P_{f_i} N_i^n(t)$$

$$N_i^0(t) = \begin{cases} 1, & t_i \leq t < t_{i+1} \\ 0, & \text{otherwise} \end{cases}$$

$$N_i^n(t) = \frac{t - t_i}{t_{i+n} - t_i} N_i^{n-1}(t) + \frac{t_{i+n+1} - t}{t_{i+n+1} - t_{i+1}} N_{i+1}^{n-1}(t)$$

Here, to obtain an open uniform B-spline passing through the first control point $P_0$ and the last control point $P_m$, multiple knots (n+1) are provided at the beginning and the end as below. It should be noted that the number p of knot vectors is p=m+n+1.

$$t_0 = t_1 = \ldots = t_n = 0$$

$$t_{p-n} = t_{p-n+1} = \ldots = t_p = 1$$

FIG. 9 shows an example of generation of control points and a B-spline curve according to the first embodiment. In this example, control points $P_0$ to $P_8$ is shown in FIG. 8 are provided in a coordinate system where the moving distance B and the speed F serve as the axes. For example, a control point $P_3$ corresponding to a start point of a command block with the block number 3 is provided at coordinates $(P_{b3}, P_{f3})$.

Based on these control points, a B-spline curve C(t) of a designated order, such as a quadratic B-spline curve C(t), is generated.

The commanded speed output unit 14 outputs a generated commanded speed for each predetermined stroke as an interpolation unit, thereby controlling the machine tool. More specifically, when the moving distance B(t) is measured per interpolation unit, the commanded speed output unit 14 calculates t as a solution to a quadratic equation of a knot t as follows, calculates the commanded speed F(t) from t, and outputs the calculated speed. It should be noted that α, β, and γ are coefficients defined from the moving distance $P_{bi}$ and given B(t) at a control point.

$$B(t) = \sum_{i=0}^{m} P_{b_i} N_i^n(t)$$

$$0 = \alpha t^2 + \beta t + \gamma$$

$$t = \frac{-\beta \pm \sqrt{\beta^2 - 4\alpha\gamma}}{2\alpha}$$

$$F(t) = \sum_{i=0}^{m} P_{f_i} N_i^n(t)$$

An example of calculation of a B-spline curve will be described next.

(First example of calculation: the number L of segments=1, the order n=2, the number (m+1) of control points=3)

A quadratic B-spline curve C(t) with one segment using $P_0$, $P_1$, and $P_2$ as control points and passing through $P_0$ and $P_2$ at opposite ends is expressed by the formula below. It should be noted that the number (m+1) of control points, the order n, and the number L of segments satisfies m=n+L−1.

$$C(t) = \sum_{i=0}^{m} P_i N_i^n(t) = \sum_{i=0}^{2} P_i N_i^2(t) = P_0 N_0^2(t) + P_1 N_1^2(t) + P_2 N_2^2(t)$$

The number p of knot vectors $\{t_0, \ldots, t_p\}$ is determined as follows: p=m+n+1=5. To acquire an open uniform B-spline curve, if (n+1)=3 multiple knots are provided at a start point and an end point, the knot vector is determined as follows: $\{t_0, \ldots, t_5\} = \{0, 0, 0, 1, 1, 1\}$. The domain being $t_2 \leq t < t_3$, a constant basis function takes 1 only if $t_2 \leq t < t_3$ is satisfied, and constant to quadratic basis functions are calculated as follows, respectively:

$$N_0^0(t) = 0, t = t_0 = t_1 = 0$$

$$N_1^0(t) = 0, t = t_1 = t_2 = 0$$

$$N_2^0(t) = 1, t_2 = 0 \leq t < t_3 = 1$$

$$N_3^0(t) = 0, t = t_3 = t_4 = 1$$

$$N_4^0(t) = 0, t = t_4 = t_5 = 1$$

$$N_0^1(t) = \frac{t - t_0}{t_1 - t_0} N_0^0(t) + \frac{t_2 - t}{t_2 - t_1} N_1^0(t) = \frac{t - 0}{0 - 0} \times 0 + \frac{0 - t}{0 - 0} \times 0 = 0$$

$$N_1^1(t) = \frac{t - t_1}{t_2 - t_1} N_1^0(t) + \frac{t_3 - t}{t_3 - t_2} N_2^0(t) = \frac{t - 0}{0 - 0} \times 0 + \frac{1 - t}{1 - 0} \times 1 = 1 - t$$

$$N_2^1(t) = \frac{t - t_2}{t_3 - t_2} N_2^0(t) + \frac{t_4 - t}{t_4 - t_3} N_3^0(t) = \frac{t - 0}{1 - 0} \times 1 + \frac{1 - t}{1 - 1} \times 0 = t$$

-continued $$N_3^1(t) = \frac{t - t_3}{t_4 - t_3} N_3^0(t) + \frac{t_5 - t}{t_5 - t_4} N_4^0(t) = \frac{t - 1}{1 - 1} \times 0 + \frac{1 - t}{1 - 1} \times 0 = 0$$

$$N_0^2(t) = \frac{t - t_0}{t_2 - t_0} N_0^1(t) + \frac{t_3 - t}{t_3 - t_1} N_1^1(t) = \frac{t - 0}{0 - 0}(0) + \frac{1 - t}{1 - 0}(1 - t) = (1 - t)^2$$

$$N_1^2(t) =$$

$$\frac{t - t_1}{t_3 - t_1} N_1^1(t) + \frac{t_4 - t}{t_4 - t_2} N_2^1(t) = \frac{t - 0}{1 - 0} \times (1 - t) + \frac{1 - t}{1 - 0} \times (t) = 2t(1 - t)$$

$$N_2^2(t) = \frac{t - t_2}{t_4 - t_2} N_2^1(t) + \frac{t_5 - t}{t_5 - t_3} N_3^1(t) = \frac{t - 0}{1 - 0}(t) + \frac{1 - t}{1 - 1}(0) = t^2$$

Thus, when the moving distance B(t) is given per interpolation unit, the commanded speed F(t) is calculated using the knot t as follows:

$$B(t) = P_{b_0}(1 - t)^2 + P_{b_1}(2t(1 - t)) + P_{b_2}(t^2)$$

$$0 = (P_{b_0} - 2P_{b_1} + P_{b_2})t^2 + (-2P_{b_0} + 2P_{b_1})t + (P_{b_0} - B(t))$$

$$t = \frac{-\beta \pm \sqrt{\beta^2 - 4\alpha\gamma}}{2\alpha}$$

$$\alpha = P_{b_0} - 2P_{b_1} + P_{b_2}$$

$$\beta = -2P_{b_0} + 2P_{b_1}$$

$$\gamma = P_{b_0} - B(t)$$

$$F(t) = P_{f_0}(1 - t)^2 + P_{f_1}(2t(1 - t)) + P_{f_2}(t^2)$$

(Second example of calculation: the number L of segments=2, the order n=2, the number (m+1) of control points=4)

A quadratic B-spline curve C(t) with two segments using $P_0$, $P_1$, $P_2$, and $P_3$ as control points and passing through $P_0$ and $P_4$ at opposite ends is expressed by the following formula:

$$C(t) = \sum_{i=0}^{m} P_i N_i^n(t) = \sum_{i=0}^{3} P_i N_i^2(t) = P_0 N_0^2(t) + P_1 N_1^2(t) + P_2 N_2^2(t) + P_3 N_3^2(t)$$

The number p of knot vectors $\{t_0, \ldots, t_p\}$ is p=m+n+1=6. To acquire an open uniform B-spline curve, if (n+1)=3 multiple knots are provided at a start point and an end point, the knot vector is determined as follows: $\{t_0, \ldots, t_6\} = \{0, 0, 0, 1, 2, 2, 2\}$. The open uniform B-spline curve is acquired by making uniform change outside a multiple knot zone, while the non-uniform B-spline curve with different weights on each control point is acquired by making non-uniform change or multiplication outside the multiple knot zone. The domain being $t_2 \leq t < t_4$, a constant basis function takes 1 only if $t_2 \leq t < t_4$ is satisfied, as understood from the following formula:

$$N_0^0(t) = 0, t = t_0 = t_1 = 0$$

$$N_1^0(t) = 0, t = t_1 = t_2 = 0$$

$$N_2^0(t) = 1, t_2 = 0 \leq t < t_3 = 1$$

$$N_3^0(t) = 1, t_3 = 1 \leq t < t_4 = 2$$

$$N_4^0(t) = 0, t = t_4 = t_5 = 2$$

$$N_5^0(t) = 0, t = t_5 = t_6 = 2$$

In a range $0 \leq t < 1$ of the knot t in the first segment, a linear basis function and a quadratic basis function are calculated as follows, respectively:

$$N_0^1(t) = \frac{t-t_0}{t_1-t_0}N_0^0(t) + \frac{t_2-t}{t_2-t_1}N_1^0(t) = \frac{t-0}{0-0} \times 0 + \frac{0-t}{0-0} \times 0 = 0$$

$$N_1^1(t) = \frac{t-t_1}{t_2-t_1}N_1^0(t) + \frac{t_3-t}{t_3-t_2}N_2^0(t) = \frac{t-0}{0-0} \times 0 + \frac{1-t}{1-0} \times 1 = 1-t$$

$$N_2^1(t) = \frac{t-t_2}{t_3-t_2}N_2^0(t) + \frac{t_4-t}{t_4-t_3}N_3^0(t) = \frac{t-0}{1-0} \times 1 + \frac{2-t}{2-1} \times 0 = t$$

$$N_3^1(t) = \frac{t-t_3}{t_4-t_3}N_3^0(t) + \frac{t_5-t}{t_5-t_4}N_4^0(t) = \frac{t-1}{2-1} \times 0 + \frac{2-t}{2-2} \times 0 = 0$$

$$N_0^2(t) = \frac{t-t_0}{t_2-t_0}N_0^1(t) + \frac{t_3-t}{t_3-t_1}N_1^1(t) = \frac{t-0}{0-0}(0) + \frac{1-t}{1-0}(1-t) = (1-t)^2$$

$$N_1^2(t) = \frac{t-t_1}{t_3-t_1}N_1^1(t) + \frac{t_4-t}{t_4-t_2}N_2^1(t) = $$
$$\frac{t-0}{1-0} \times (1-t) + \frac{2-t}{2-0} \times (t) = \frac{1}{2}t(4-3t)$$

$$N_2^2(t) = \frac{t-t_2}{t_4-t_2}N_2^1(t) + \frac{t_5-t}{t_5-t_3}N_3^1(t) = \frac{t-0}{2-0}(t) + \frac{2-t}{2-1}(0) = \frac{1}{2}t^2$$

In a range $1 \leq t < 2$ of the knot t in the second segment, a linear basis function and a quadratic basis function are calculated as follows, respectively:

$$N_1^1(t) = \frac{t-t_1}{t_2-t_1}N_1^0(t) + \frac{t_3-t}{t_3-t_2}N_2^0(t) = \frac{t-0}{0-0} \times 0 + \frac{1-t}{1-0} \times 0 = 0$$

$$N_2^1(t) = \frac{t-t_2}{t_3-t_2}N_2^0(t) + \frac{t_4-t}{t_4-t_3}N_3^0(t) = \frac{t-0}{1-0} \times 0 + \frac{2-t}{2-1} \times 1 = 2-t$$

$$N_3^1(t) = \frac{t-t_3}{t_4-t_3}N_3^0(t) + \frac{t_5-t}{t_5-t_4}N_4^0(t) = \frac{t-1}{2-1} \times 1 + \frac{2-t}{2-2} \times 0 = t-1$$

$$N_4^1(t) = \frac{t-t_4}{t_5-t_4}N_4^0(t) + \frac{t_6-t}{t_6-t_5}N_5^0(t) = \frac{t-2}{2-2} \times 0 + \frac{2-t}{2-2} \times 0 = 0$$

$$N_1^2(t) =$$
$$\frac{t-t_1}{t_3-t_1}N_1^1(t) + \frac{t_4-t}{t_4-t_2}N_2^1(t) = \frac{t-0}{1-0} \times (0) + \frac{2-t}{2-0} \times (2-t) = \frac{1}{2}(2-t)^2$$

$$N_2^2(t) = \frac{t-t_2}{t_4-t_2}N_2^1(t) + \frac{t_5-t}{t_5-t_3}N_3^1(t) = \frac{t-0}{2-0}(2-t) + \frac{2-t}{2-1}(t-1)$$
$$= \frac{1}{2}(2-t)(3t-2)$$

$$N_3^2(t) = \frac{t-t_3}{t_5-t_3}N_3^1(t) + \frac{t_6-t}{t_6-t_4}N_4^1(t) = \frac{t-1}{2-1}(t-1) + \frac{2-t}{2-1} \times 0 = (t-1)^2$$

Thus, when the moving distance B(t) is given per interpolation unit, the commanded speed F(t) is calculated for each segment using the knot t. That is, in the range $0 \leq t < 1$ of the first segment, the commanded speed F(t) for a moving distance $B_0(t)$ is calculated as follows:

$$B_0(t) = \sum_{i=0}^{2} P_{b_i} N_i^2(t) = P_{b_0} N_0^2(t) + P_{b_1} N_1^2(t) + P_{b_2} N_2^2(t)$$

$$= P_{b_0}(1-t)^2 + P_{b_1}\left(\frac{1}{2}t(4-3t)\right) + P_{b_2}\frac{1}{2}t^2$$

$$0 = \left(P_{b_0} - \frac{3}{2}P_{b_1} + \frac{1}{2}P_{b_2}\right)t^2 + (-2P_{b_0} + 2P_{b_1})t + (P_{b_0} - \Delta B_0)$$

$$t = \frac{-\beta \pm \sqrt{\beta^2 - 4\alpha\gamma}}{2\alpha}$$

$$\alpha = P_{b_0} - \frac{3}{2}P_{b_1} + \frac{1}{2}P_{b_2}$$

$$\beta = -2P_{b_0} + 2P_{b_1}$$

$$\gamma = P_{b_0} - B_0(t)$$

$$F(t) = P_{f_0}(1-t)^2 + P_{f_1}(2t(1-t)) + P_{f_2}(t^2)$$

In the range $1 \leq t < 2$ of the second segment, the commanded speed F(t) for a moving distance $B_1(t)$ is calculated as follows:

$$B_1(t) = \sum_{i=1}^{3} P_{b_i} N_i^2(t) = P_{b_1} N_1^2(t) + P_{b_2} N_2^2(t) + P_{b_3} N_3^2(t)$$

$$= P_{b_0}\left(\frac{1}{2}(2-t)^2\right) + P_{b_1}\left(\frac{1}{2}(2-t)(3t-2)\right) + P_{b_2}(t-1)^2$$

$$0 = \left(\frac{1}{2}P_{b_1} - \frac{3}{2}P_{b_2} + P_{b_3}\right)t^2 +$$
$$(-2P_{b_1} + 4P_{b_2} - 2P_{b_3})t + (2P_{b_1} - 2P_{b_2} + P_{b_3} - \Delta B_1)$$

$$t = \frac{-\beta \pm \sqrt{\beta^2 - 4\alpha\gamma}}{2\alpha}$$

$$\alpha = \frac{1}{2}P_{b_1} - \frac{3}{2}P_{b_2} + P_{b_3}$$

$$\beta = -2P_{b_1} + 4P_{b_2} - 2P_{b_3}$$

$$\gamma = 2P_{b_1} - 2P_{b_2} + P_{b_3} - B_1(t)$$

$$F(t) = P_{f_0}(1-t)^2 + P_{f_1}(2t(1-t)) + P_{f_2}(t^2)$$

According to the first embodiment, based on a moving distance and a speed designated for each command block in the machining program, the numerical controller 1 generates a control point expressed as a set of a cumulative moving distance corresponding to a start point position and an end point position and the speed in the command block. Then, the numerical controller 1 generates a parametric curve defining a commanded speed for the moving distance based on the generated control points and outputs a commanded speed corresponding to the moving distance per interpolation unit on the basis of the parametric curve.

Thus, when using a machining program in which a commanded speed is changed per command block to encourage improvement of machining efficiency, the numerical controller 1 can achieve reduction in impact of acceleration/deceleration as well as continuity of machining surface quality at a position where the designated speed is changed. In this way, the numerical controller 1 can suppress reduction in machining surface quality while increasing machining efficiency.

The numerical controller 1 can calculate an appropriate commanded speed using a B-spline curve, a Bézier curve, or an NURBS curve as the parametric curve.

Second Embodiment

A second embodiment of the present invention will be described hereafter. In the first embodiment, the numerical controller 1 exerted control to achieve gentle speed change using a parametric curve. Here, according to the characteristics of the parametric curve, speed change became smoother, that is, the change rate approximated a constant value, in response to increase in the order n. However, this unfortunately causes the commanded speed expressed in the parametric curve to deviate from the speed designated in the machining program.

Figures 10, 11:
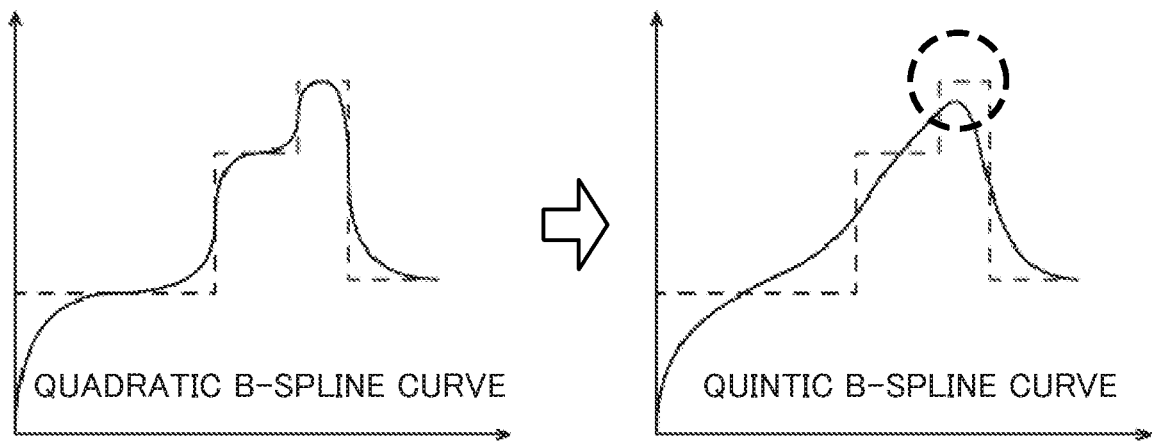
FIG. 10 shows change resulting from the order of a parametric curve according to a second embodiment.
FIG. 11 illustrates an example of a method of designating a coefficient in a machining program according to the second embodiment.

FIG. 10 shows change resulting from the order of a parametric curve according to the second embodiment. Compared to a quadratic B-spline curve, a quintic B-spline curve largely exceeds a designated speed, or conversely, falls below the designated speed. For example, in a maximum section indicated by a dashed circle, the quintic B-spline curve falls below the designated speed.

In this regard, in the second embodiment, the commanded speed generation unit 13 adjusts the commanded speed by multiplying the commanded speed by a predetermined coefficient. More specifically, the commanded speed generation unit 13 increases or reduces the commanded speed F(t), using a coefficient a designated in the machining program, as follows:

$$F(t) = \sum_{i=0}^{m} a P_{f_i} N_i^n(t)$$

FIG. 11 illustrates an example of a method of designating a coefficient in the machining program according to the second embodiment. When enabling the speed control function based on a parametric curve (M400), the order n is designated by a parameter C and the coefficient a is designated by a parameter A, for example. In this example, a quintic parametric curve is generated using "C5," and a commanded speed is increased to 110% by "A110."

Figures 12, 13:
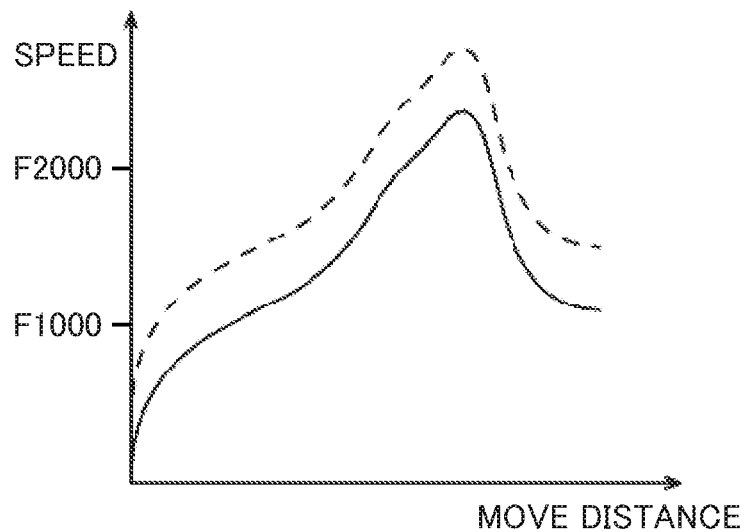
FIG. 12 illustrates an example of an adjustment result of a commanded speed according to the second embodiment.
FIG. 13 illustrates an example of modal speed information in a machining program according to a third embodiment.

FIG. 12 illustrates an example of an adjustment result of a commanded speed according to the second embodiment. The graph indicated by the solid line is a parametric curve generated with designation not to use a coefficient (A0) or to use a coefficient of the same magnification (A100). The graph indicated by the dashed line is a parametric curve generated with designated magnification by "A110," for example. In this graph, a commanded speed is adjusted to be higher than the commanded speed before the adjustment over the entire range of machining.

According to the second embodiment, the numerical controller 1 adjusts a commanded speed using a coefficient, thereby suppressing excessive reduction or increase in a commanded speed when using a high-order parametric curve. As a result, the numerical controller 1 can increase machining efficiency while achieving high-quality machining.

Third Embodiment

A third embodiment of the present invention will be described hereafter. In the first embodiment and the second embodiment, a speed is designated explicitly for each command block. However, this is not the only method of designating a speed in a machining program. If the same speed is required in multiple continuous command blocks, a designated value of speed may be described only in the first one of the continuous command blocks. In this case, the omitted designated speed is extracted by the program analysis unit 11 as modal speed information.

FIG. 13 illustrates an example of modal speed information in the machining program according to the third embodiment. For example, "F1000" designated in block number 2 is also used continuously as modal speed information in block number 3. Likewise, "F1005" designated in block number 4, "F2000" designated with a block number 6, "F2500" designated in block number 8, and "F1000" designated in block number 10 are used continuously as pieces of modal speed information in block number 5, block number 7, block number 9, and block number 11, respectively.

Figure 14:
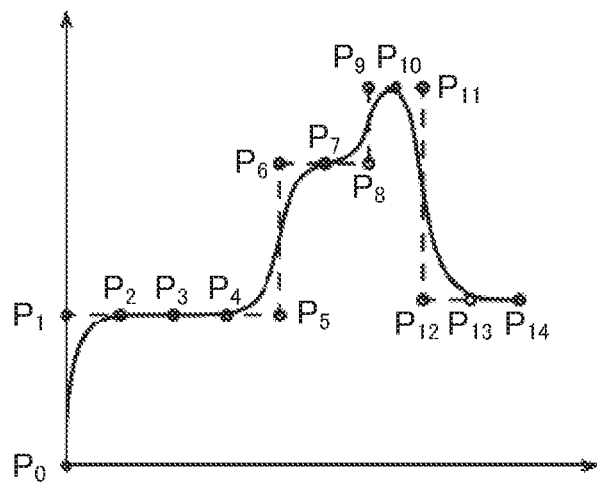
FIG. 14 illustrates an example of control points generated using a speed described in a command block in the machining program and modal speed information as well as a parametric curve based on these control points according to the third embodiment.

FIG. 14 illustrates an example of control points generated using a speed described in a command block in the machining program and modal speed information, as well as a parametric curve based on these control points according to the third embodiment. When control points $P_0$ to $P_{14}$ are generated based on the machining program in FIG. 13, since there is modal speed information or speed information with little change from that of the previous block, such as "F1005" in block number 4, many control points (three or more) are arranged along a substantially straight line.

A parametric curve based on such arrangement of control points has local straightness in the horizontal axis direction as a result of the characteristics of this parametric curve. Hence, as shown in FIG. 14, steep speed change is still recognized in a quintic B-spline curve, and similar characteristics may appear even in a B-spline curve of a higher order, causing the risk of reduction in machining surface quality.

In this regard, in the third embodiment, upon generating a control point, the control point generation unit 12 omit control points having a speed equal to those of both their preceding and following control points. The commanded speed generation unit 13 generates a parametric curve based on control points from which some control points have been omitted. For this generation, the control point generation unit 12 may omit control points having a speed difference with their preceding and flowing control points within a designated speed range.

Figure 15:
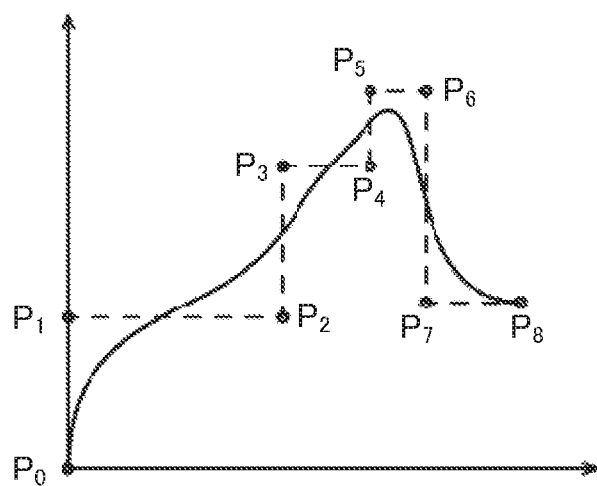
FIG. 15 illustrates an example of control points resulting from omission from the machining program as well as a parametric curve based on these control points according to the third embodiment.

FIG. 15 illustrates an example of control points resulting from omission from the machining program, and a parametric curve based on these control points according to the third embodiment. In this example, among the control points $P_0$ to $P_{14}$ shown in FIG. 14, control points having a speed equal to or approximating those of both their preceding and following control points are omitted. As a result, among the control points aligned along a substantially straight line, only the control points at opposite ends are left. The parametric curve based on control points $P_0$ to $P_8$ after the omission achieves gentle speed change without straightness in the horizontal axis direction which is recognized in FIG. 14.

Figure 16:
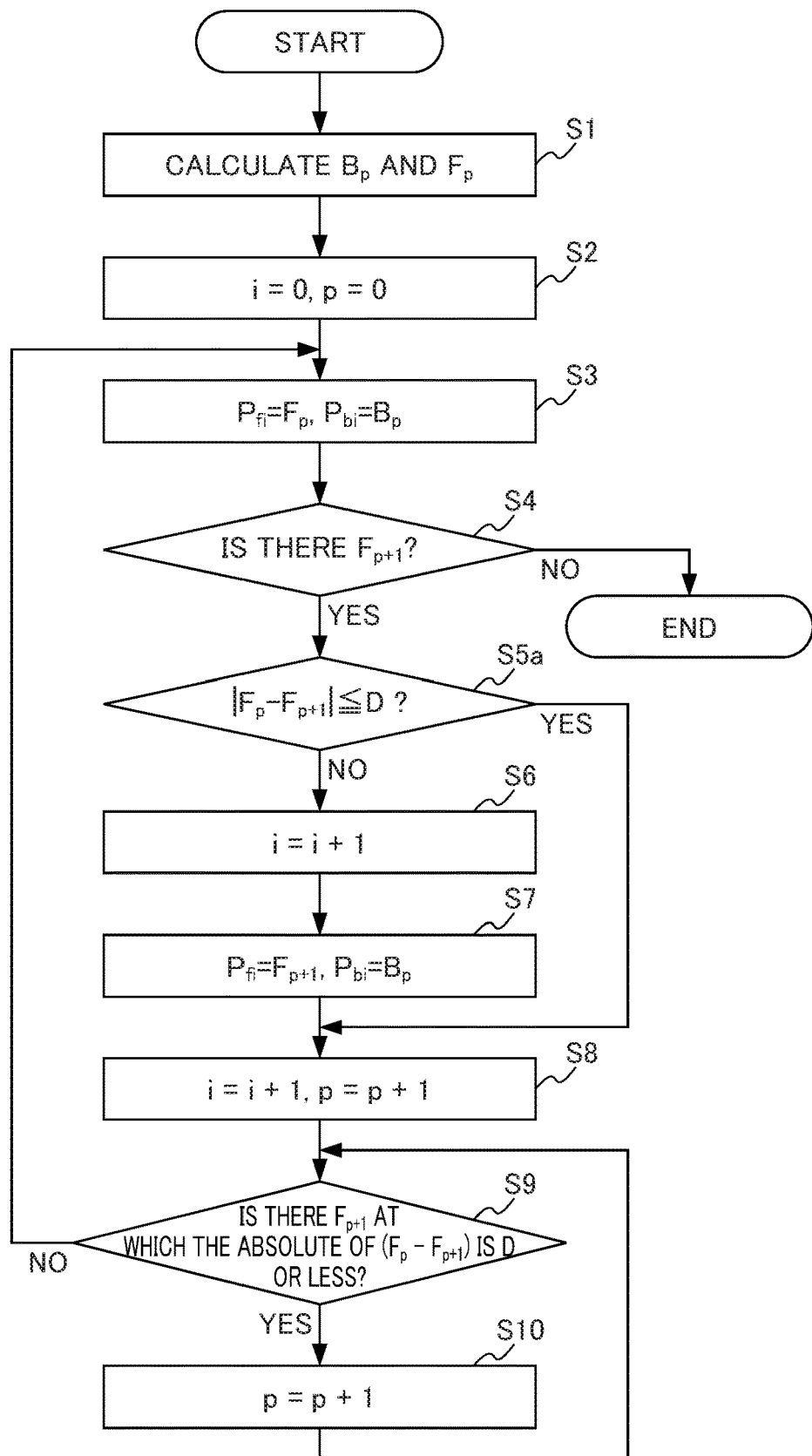
FIG. 16 is a flowchart showing a method of generating a control point according to the third embodiment.

FIG. 16 is a flowchart showing a method of generating a control point according to the third embodiment. Here, steps S1 to S8 are the same as those in the flowchart according to the first embodiment (FIG. 7) except that step S5a is changed and steps S9 and S10 are added.

In step S5a, the control point generation unit 12 determines speed change within a predetermined range D in the same manner as a determination as to equality between designated speeds. More specifically, the control point generation unit 12 determines whether or not a difference between the designated speed of the current (p-th) command block and the next ((p+1)-th) command block is within D.

In step S8, the indexes i and p are counted up. Next, in step S9, the control point generation unit 12 determines whether or not there is a following ((p+1)-th) command block with a designated speed differing by D or less from that of the current (p-th) command block. If it is determined as YES, the processing shifts to step S10. If it is determined as NO, the processing shifts to step S3.

In step S10, the control point generation unit 12 omits generation of a control point corresponding to an end point of the current (p-th) command block, and counts up the index p. Then, the processing returns to step S9.

FIG. 17 shows an example in which none of the control points derivable from the machining program are omitted according to the third embodiment. In this case, control points having equal or approximate designated speeds are generated continuously from the machining program in FIG. 13. More specifically, the control points $P_1$ to $P_5$, the control points $P_6$ to $P_8$, the control points $P_9$ to $P_{11}$, and the control points $P_{12}$ to $P_{14}$ are generated along substantially straight lines in the horizontal axis direction, respectively.

FIG. 18 shows an example in which some of the control points derivable from the machining program are omitted according to the third embodiment. In this case, the control points $P_2$ to $P_4$, $P_7$, $P_{10}$ and $P_{13}$ are omitted from among the control points $P_0$ to $P_{14}$ generated in FIG. 17, and new control points $P_0$ to $P_8$ are generated.

Figure 19:
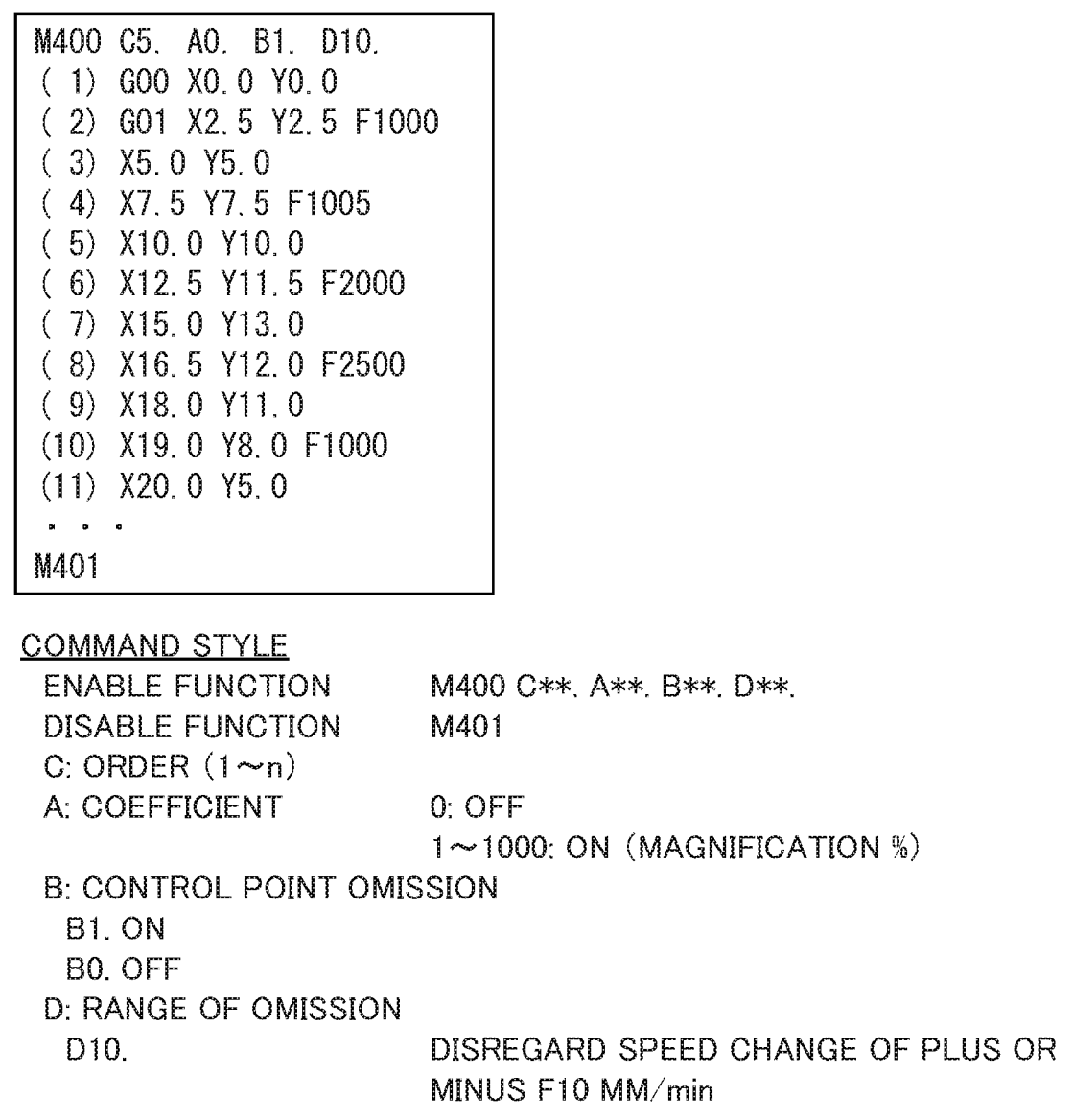

FIG. 19 illustrates an example of a method of designating a function of omitting control points in the machining program according to the third embodiment. When enabling a speed control function based on a parametric curve (M400), enabling (B1) or disabling (B0) of a function of omitting control points is designated by a parameter B, and a speed range to be omitted is designated by a parameter D, for example. In this example, speed change of plus or minus 10 mm/min is disregarded by "D10."

According to the third embodiment, the numerical controller 1 omits some of continuous control points having an equal speed, thereby relaxing straightness in the direction of the horizontal axis (moving distance) of a parametric curve generated from these control points. By doing so, speed change can be made gentle. Thus, even if the same speed (described speed or modal speed information) is extracted from multiple continuous command blocks, the numerical controller 1 can still generate an appropriate parametric curve, and therefore, reduction in machining surface quality can be suppressed while machining efficiency is increased.

The numerical controller 1 can, by omitting control points having a speed equal to those of both their preceding and following control points as well as control points having a speed difference with their preceding and following control points within a designated range, thereby further relaxing straightness in the horizontal axis direction of a parametric curve, so that speed change becomes gentle.

While the embodiments of the present invention have been described above, the present invention should not be limited to the foregoing embodiments. The effects described in the embodiments are merely a list of the most preferable effects resulting from the present invention. Effects achieved by the present invention should not be limited to those described in the embodiments.

The numerical control method executed by the numerical controller 1 is realized by software. To realize the numerical control method by software, programs constituting the software are installed on a computer. These programs may be stored in a removable medium and distributed to a user, or alternatively, may be distributed by being downloaded to a computer of the user through a network.

EXPLANATION OF REFERENCE NUMERALS

1 Numerical controller
10 Control unit
11 Program analysis unit
12 Control point generation unit
13 Commanded speed generation unit.
14 Commanded speed output unit
20 Storage unit

What is claimed is:

1. A numerical controller comprising:
a program analysis unit that analyzes a machining program for controlling a machine tool and calculates a cumulative moving distance for each command block based on a designated coordinate for each command block;
a control point generation unit that generates, based on the cumulative moving distance for each command block and a designated speed for each command block, a control point as a set of the cumulative moving distance and the designated speed at a start point and an end point in each command block, a plurality of control points being generated by the control point generation unit and at least one control point being generated for each command block;
a commanded speed generation unit that generates a parametric curve defining an actual commanded speed for the machine tool for the moving distance based on the plurality of control points thereby generated; and
a commanded speed output unit that outputs the commanded speed for each of a plurality of predetermined strokes based on the generated parametric curve.

2. The numerical controller according to claim 1, wherein the commanded speed generation unit adjusts the commanded speed using a predetermined coefficient.

3. The numerical controller according to claim 1, wherein the parametric curve is any one of a B-spline curve, a Bézier curve, or a non-uniform rational B-spline (NURBS) curve.

4. The numerical controller according to claim 1, wherein the control point generation unit omits control points having a speed equal to those of both their preceding and following control points.

5. The numerical controller according to claim 4, wherein the control point generation unit omits control points having a speed difference with their preceding and following control points within a designated speed range.

6. A numerical control method executed by a computer, the numerical control method comprising:
a program analysis step of analyzing a machining program for controlling a machine tool and calculating a cumulative moving distance for each command block based on a designated coordinate for each command block;
a control point generation step of generating, based on the cumulative moving distance for each command block and a designated speed for each command block, a control point as a set of the cumulative moving distance and the designated speed at a start point and an end point in each command block, a plurality of control points being generated by the control point generation step and at least one control point being generated for each command block;
a commanded speed generation step of generating a parametric curve defining an actual commanded speed for the machine tool for the moving distance based on the plurality of control points thereby generated; and
a commanded speed output step of outputting the commanded speed for each of a plurality of predetermined strokes based on the generated parametric curve.

7. A non-transitory computer-readable medium storing a numerical control program for causing a computer to execute:

a program analysis step of analyzing a machining program for controlling a machine tool and calculating a cumulative moving distance for each command block based on a designated coordinate for each command block;

a control point generation step of generating, based on the cumulative moving distance for each command block and a designated speed for each command block, a control point as a set of the cumulative moving distance and the designated speed at a start point and an end point in each command block, a plurality of control points being generated by the control point generation step and at least one control point being generated for each command block;

a commanded speed generation step of generating a parametric curve defining an actual commanded speed for the machine tool for the moving distance based on the plurality of control points thereby generated; and a commanded speed output step of outputting the commanded speed for each of a plurality of predetermined strokes based on the generated parametric curve.

* * * * *